United States Patent [19]
Schlosser

[11] Patent Number: 6,061,821
[45] Date of Patent: May 9, 2000

[54] CONTEXT BASED ERROR DETECTION AND CORRECTION FOR BINARY ENCODED TEXT MESSAGES

[75] Inventor: Thomas W. Schlosser, San Diego, Calif.

[73] Assignee: The United States of America as represented by the Secretary of the Navy, Washington, D.C.

[21] Appl. No.: 09/005,207

[22] Filed: Jan. 9, 1998

[51] Int. Cl.[7] .................................................. G06F 11/10
[52] U.S. Cl. ........................ 714/752; 714/821; 714/822
[58] Field of Search .................................... 714/752, 758, 714/822, 821

[56] References Cited

U.S. PATENT DOCUMENTS

| | | | |
|---|---|---|---|
| 4,146,909 | 3/1979 | Beckenhauer et al. | 360/39 |
| 4,301,327 | 11/1981 | Lee et al. . | |
| 4,599,722 | 7/1986 | Mortimer . | |
| 4,674,065 | 6/1987 | Lange et al. | 364/900 |
| 4,837,737 | 6/1989 | Watanabe . | |
| 4,982,429 | 1/1991 | Takaragi et al. . | |
| 5,003,596 | 3/1991 | Wood . | |
| 5,014,313 | 5/1991 | Kotzin . | |
| 5,214,696 | 5/1993 | Keiser, II et al. . | |
| 5,245,658 | 9/1993 | Bush et al. . | |
| 5,301,235 | 4/1994 | Shimada . | |
| 5,396,228 | 3/1995 | Garahi | 340/825.44 |
| 5,426,426 | 6/1995 | Hymel . | |
| 5,428,643 | 6/1995 | Razzell . | |
| 5,452,358 | 9/1995 | Normile et al. . | |

*Primary Examiner*—Emmanuel L. Moise
*Assistant Examiner*—Esaw Abraham
*Attorney, Agent, or Firm*—Harvey Fendelman; Peter A. Lipovsky; Michael A. Kagan

[57] ABSTRACT

A system for encoding and decoding a binary encoded text message using context-based error detection and correction implements the stops of: a) defining a dictionary of m dictionary words, $W_i$, where each dictionary word is assigned a unique binary code word, represented by a series of bits, and an identifier, $IDFR_i$ such that for any two words $W_p$ and $W_q$ from the dictionary, if $IDFR_p = IDFR_q$, then the binary code word for the word $W_p$ differs from the binary code word for the word $W_q$ by more than one bit, and where i, p, and q are each an index from 1 to (m−1), and m is a positive integer; b) receiving a message comprised of words selected from the dictionary; c) encoding the message to form an encoded message comprised of selected ones of the dictionary words; d) transmitting the encoded message; receiving the encoded message; e) decoding the encoded message to form a decoded message comprised of decoded message words; f) displaying the decoded message words; and g) displaying candidate words from the dictionary having code words one bit different from the code words associated with suspected erroneous words selected from the decoded message words if the decoded message includes any suspected erroneous words.

7 Claims, 2 Drawing Sheets

CONTEXT BASED ERROR DETECTION AND CORRECTION FOR BINARY ENCODED TEXT MESSAGES

BACKGROUND OF THE INVENTION

The present invention generally relates to the field of error detection and correction, and more particularly to a system and method which characterizes English language words to improve error detection and correction for binary encoded text messages.

Text information encoded into binary bits may be transmitted by both computers and radio links. Such text information may be encoded using a dictionary from which the words used in the message are selected. The dictionary includes a unique code word that is assigned to each word. Messages then are encoded by parsing them into individual words and then transmitting the code word corresponding to that word. When encoded in this fashion, bit errors appear as incorrect words rather than say, incorrect characters as would be the case in a character-based encoding scheme. Since the code words containing errors are decoded into different words, the person reading the decoded message may not be able to detect the error. For example, assume that the code word for the word "green" is "0001," and the code word for the "red" is "0011." An error in the third bit of the code word assigned to the word "green" would result in substitution of the word "red" for "green." In such case, a single bit error could cause the message: "The car is green." to become "The car is red." A human reader may not realize the message contains an error.

A need therefore exists for a coding scheme by which errors in binary encoded text messages could be detected based on the context of the message.

SUMMARY OF THE INVENTION

The present invention provides a system for encoding and decoding a binary encoded text message using context-based error detection and correction. An input message provided to an input device, such as a keyboard, transforms the message into a signal which is readable by a computer. The computer transforms the signal into binary encoded message words by assigning a unique binary code word to each word contained in the signal. The binary code words are provided to the computer by a computer implemented dictionary functionally integrated with the computer, as for example, in the form of a look-up table. The input message is comprised of words selected from a predetermined list of dictionary words stored in the dictionary. The dictionary words are each assigned a unique binary code word, and are organized within the dictionary in a particular structure, described in greater detail below. The computer constructs an encoded message comprised of code words from the dictionary that are assigned to each dictionary word that match the identical word of the input message. The encoded message is provided to a transmitter which generates a transmitted signal that is detected by a receiver and provided to a second computer.

The second computer transforms the encoded message into a decoded message by matching each code word of the decoded message with the identical code word stored in a second dictionary functionally integrated with the second computer, where the second dictionary is substantially identical to the first dictionary. The second computer transforms the encoded message into a decoded message by replacing each encoded binary word of the message with a word from the second dictionary having a code word identical to the corresponding encoded message code word. The words comprising the decoded message then are displayed in human readable form by display device, such as a printer and/or video monitor.

A human operator then may review the displayed message for context errors. If any context errors appear, the human operator enters the suspect words as a suspect error input message into a second input device coupled to the second computer. The second computer then identifies all code words in the second dictionary that are one bit different than the code words associated with the suspect words and presents such identified words as context correction candidate words on the display. To correct the message, the human operator selects appropriate ones of the context correction candidate words to replace each of the suspect words so that the message has proper syntax for the particular language used, as for example, English.

A system embodying the invention for encoding and decoding a binary encoded text message using context-based error detection and correction implements the steps of: a) defining a dictionary of m dictionary words, $W_i$, where each dictionary word is assigned a unique binary code word, represented by a series of bits, and an identifier, $IDFR_i$ such that for any two words $W_p$ and $W_q$ from the dictionary, if $IDFR_p = IDFR_q$, then the binary code word for the word $W_p$ differs from the binary code word for the word $W_q$ by more than one bit, and where i, p, and q are each an index from 1 to (m−1), and m is a positive integer; b) receiving a message comprised of words selected from the dictionary; c) encoding the message to form an encoded message comprised of selected ones of the dictionary words: d) transmitting the encoded message; receiving the encoded message; e) decoding the encoded message to form a decoded message comprised of decoded message words; f) displaying the decoded message words; and g) displaying candidate words from the dictionary having code words one bit different from the code words associated with suspected erroneous words selected from the decoded message words if the decoded message includes any suspected erroneous words.

An important advantage of the invention is that it provides a system and method for identifying and correcting errors in binary encoded text messages based on the context of the message in accordance with the syntax rules of a language. These and other advantages will become more readily apparent upon review of the accompanying specification, including the claims, and the drawings.

BRIEF DESCRIPTION OF THE DRAWINGS

Throughout the several views, like elements are referenced using like designations.

DESCRIPTION OF THE PREFERRED EMBODIMENT

Figure 1:
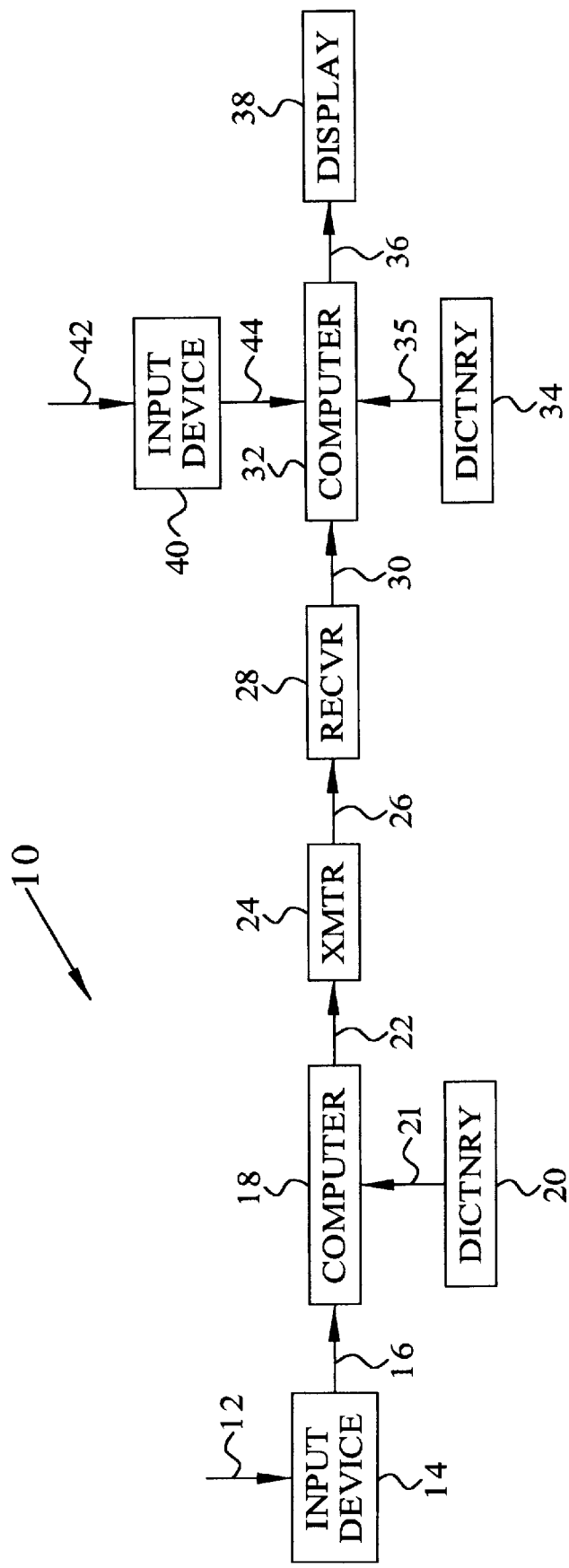
FIG. 1 shows a block diagram of a system for encoding and decoding binary encoded text message that uses context-based error detection and correction in accordance with the present invention.

The present invention provides a system 10 which implements a method for encoding and decoding binary encoded text message using context-based error detection and correction. System 10 is described with reference to FIG. 1. An input message 12 is provided to input device 14, such as a keyboard, which transforms the message into a signal 16 which is readable by computer 18. The computer 18 transforms the words of message in signal 16 into binary encoded message words by assigning a unique binary code word to each word contained in signal 16. The binary code words are provided to computer 18 via signal line 21 by dictionary 20 which may be implemented as a look-up table. The input message 12 is comprised of words selected from a predetermined group of dictionary words stored in dictionary 20. The dictionary words are each assigned a unique binary code word, and are stored within the dictionary 20 in a particular structure, as described further herein. The computer 18 constructs an encoded message 22 comprised of code words from dictionary 20 that are assigned to each dictionary word that match the identical word of input message 12. The encoded message 22 is provided to transmitter 24 which generates transmitted signal 26 that is received by receiver 28. By way of example, transmitter 24 and receiver 28 may be implemented as a radio frequency, optical, or acoustic transmitter and receiver, respectively.

The signal 26 is detected by receiver 28 and provided to computer 32 via signal line 30. Computer 32 transforms the encoded message into a decoded message 36 by matching each code word of the decoded message with the identical code word stored in dictionary 34, coupled to computer 32 via signal line 35. Dictionary 34 is identical to dictionary 20. Computer 32 transforms the encoded message into a decoded message 36 by replacing each encoded binary word of message 22 with the dictionary word of dictionary 34 associated with the dictionary code word that is identical to each encoded message code word. The words comprising decoded message 36 are then displayed by display device 38, such as a printer and/or video monitor. The coded and decoded messages may also be stored in computer 32 for later retrieval.

A human operator then may review the displayed message for context errors. If any context errors appear to be present, the human operator enters the suspect words as a suspect error input message 42 into input device 40. The suspect error input message 42 is provided to computer 32 via signal line 44. Computer 42 then identifies all code words in dictionary 34 that are one bit different than the code words associated with the words of the suspect error input message 42, and presents such words as context correction candidate words on display 38. To correct the message, the human operator then may replace the error word(s) by selecting appropriate ones of the context correction candidate words that result in a message having proper syntax in a particular language, such as English, for example. However, it is to be understood that the invention may include the use of the structures of languages other than English, such as French, German, Italian, Spanish, Russian, Japanese, Chinese, etc.

Figure 2:
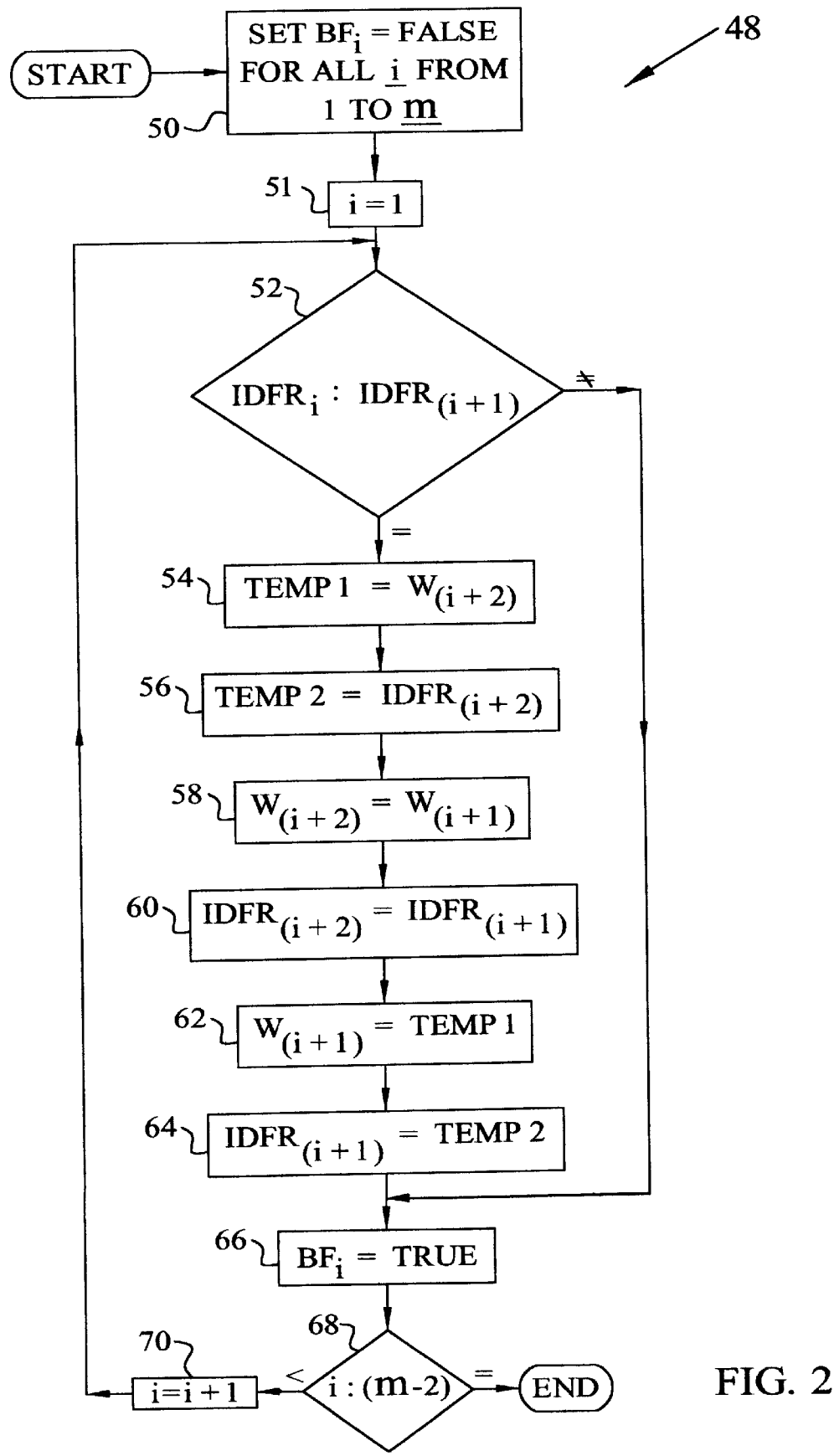
FIG. 2 is a flow chart showing a process for restructuring the dictionary used in the system described in FIG. 1.

A flow chart 48 illustrating the creation of dictionary 20 containing an m number of dictionary word, $W_i$, is described with reference to FIG. 2, and Tables 1 and 2, where m is a positive integer. The words to be included in the dictionary (dictionary words) are identified and binary code words are assigned to each dictionary word. Then an identifier is assigned to each word. The identifier identifies each dictionary word as, for example, a noun, adjective, verb, adverb, or definite article. If a dictionary word may be characterized by more than one identifier, a decision is made by the human user to determine and assign an identifier for that word. Such assignment may be made manually or through suitable software. Next, a boolean flag, $BF_i$, having a logic level such as FALSE or TRUE, is assigned to each word, where i is an index in the range of 1 to m. However, it is to be understood that the logic levels of the boolean flags may also be represented by a "1" or "0." The flag associated with a particular word represents whether or not that word has been "fixed" in the dictionary, i.e., where its position in the dictionary is permanent. The dictionary words then are ordered in dictionary 20 so that the code words and associated words are stored in binary coded number sequence. By way of example, dictionary 20 may be implemented as a software or hardware memory structure which stores digital information.

An example of an initial dictionary containing 19 (m=19) words is presented by way of example in TABLE 1. In TABLE 1: the word THE has an initial word index of "1," an identifier which categorizes the word THE as a DEFINITE ARTICLE, and a code word of "01." The word BLUEFIN has an initial word index of 14, a NOUN identifier, and a code word of 001111. It should be noted that the dictionary words are placed in a sequence whereby the code words associated with each dictionary word are arranged in a binary sequence. For example, the code words of the first three words, THE, MOVE, and ORANGE, are 01, 001, and 011, respectively. All of the dictionary words in TABLE 1 initially have boolean flags set to have a logic level referenced as FALSE.

TABLE 1

(Initial Dictionary)

| Word Index (i) | Word ($W_{(i)}$) | Identifier ($IDF_i$) | Code word | Nearest code words | Boolean Flag ($BF_i$) |
|---|---|---|---|---|---|
| 1 | The | Definite article | 01 | | False |
| 2 | Move | Verb | 001 | Orange | False |
| 3 | Orange | Adjective | 011 | Move | False |
| 4 | Cruise | Verb | 0001 | USS | False |
| 5 | USS | Adjective | 0011 | Cruise, Red | False |
| 6 | Red | Adjective | 0111 | USS | False |
| 7 | Norfolk | Noun | 00001 | Sailor | False |
| 8 | Sailor | Noun | 00011 | Norfolk, To | False |
| 9 | To | Preposition | 00111 | Sailor, Is | False |
| 10 | Is | Verb | 01111 | To | False |
| 11 | Chicago | Noun | 000001 | Night | False |
| 12 | Night | Noun | 000011 | Chicago, For | False |
| 13 | For | Preposition | 000111 | Night, Bluefin | False |
| 14 | Bluefin | Noun | 001111 | For, And | False |
| 15 | And | Conjunction | 011111 | Bluefin | False |
| 16 | Quickly | Adverb | 0000001 | Quietly | False |
| 17 | Quietly | Adverb | 0000011 | Quickly, Bahrain | False |
| 18 | Bahrain | Noun | 0000111 | Quietly, Operations | False |
| 19 | Operations | Noun | 00011111 | Bahrain, Torpedo | False |

After the dictionary words are identified, and given identifiers, code words, and indices, the dictionary is generally restructured. The process for restructuring the dictionary is summarized as follows: Starting with a "reference" word in the dictionary, every (test) word below the reference word whose code word is a single bit different from the code word associated with the reference word is identified. If any of the test words have an identifier equal to the identifier of the reference word, the test word and its identifier exchange places in the table with the next word and its identifier. Then the position of the reference word is fixed in the dictionary by changing the boolean flag for the reference word from one logic level to another, as for example, from FALSE to TRUE. A "fixed" word is one that is no longer used as a variable and its position in the dictionary is permanent. The positions of the code words in the dictionary remain fixed. All words whose code words are one bit different from the code word of the reference word are fixed in the dictionary and their boolean flags are set to TRUE. When no non-fixed words below the test word in the dictionary have an identifier different from the reference word, the process is complete and the code word assignments are permanent.

The process for restructuring the dictionary 20 may be performed using a suitable software routine implemented in a computer. An example of a suitable software routine 48 is described with reference to the flow chart in FIG. 2 and TABLES 1, 2, and 3. In TABLE 1, for example, where i=1, the first word, $W_1$, is THE and has the a type characterization, $IDFR_1$, of DEFINITE ARTICLE. The second word, $W_2$, is MOVE and has an identifier, $IDFR_2$, of VERB. At step 50, all boolean flags, $BF_i$, are initially set to FALSE for all i from 1 to m, where by way of example, m=19 in TABLES 1, 2, and 3. At step 51, an index i is initialized whereby i=1. At step 52 the type characterization, $IDFR_i$, of $W_i$ in the dictionary is compared with the type characterization $IDFR_{(i+1)}$ with the word, $W_{(i+1)}$, in the dictionary. If the determination at step 52 is that $IDFR_i \neq IDFR_{(i+1)}$, program 48 proceeds to step 66, described below. If, however, the determination at step 52 is that $IDFR_i = IDFR_{(i+1)}$, program 48 continues to step 54 where a variable TEMP1 is set equal to $W_{(i+2)}$. Next at step 56, a variable TEMP2 is set equal to $IDFR_{(i+2)}$. Proceeding to step 58, $W_{(i+2)}$ is set equal to $W_{(i+1)}$, and at step 60, $IDFR_{(i+2)}$ is set equal to $IDFR_{(i+1)}$. Next, at step 62, $W_{(i+1)}$ is set equal to TEMP1. Then $IDFR_{(i+1)}$ is set equal to TEMP2 at step 64. At step 66, the boolean flag, $BF_i$ is set equal to TRUE. The index, i, is compared to the value of (m−2) at step 68. If i<(m−2), i is incremented at step 70 and program 48 returns to step 52. If the determination at step 68 is that i=(m−2), then program 48 ends, and the restructuring of the dictionary is complete.

In TABLE 1, $IDFR_i$ first equals $IDFR_{(i+1)}$ when i=5, where $IDFR_i$ and $IDFR_{(i+1)}$ are both equal to ADJECTIVE. Then by following the logic of program 48, at step 54, TEMP1 is set equal to NORFOLK. At step 56, TEMP2 is set equal to NOUN. Next, $W_7$ is set equal to RED at step 58 and $IDFR_7$ is set equal to NOUN at step 60. The variable $W_6$ is set equal to TEMP1 (NORFOLK) at step 62, and $IDFR_6$ is set equal to TEMP2 (NOUN) at step 64. The boolean flag for $BF_5$ is set equal to TRUE. The dictionary 20 is then structured as shown in TABLE 2. Program 48 moves the word RED and its identifier ADJECTIVE, each originally having an index of "6," down in dictionary 20 so that they have an index of "7," and moves the word NORFOLK and its identifier NOUN in the dictionary so that they each have an index of "6" instead of "7." In other words, the original word $W_6$ and its identifier $IDFR_6$ exchange positions in the dictionary with the original word $W_7$ and its identifier $IDFR_7$. The boolean flag for $W_5$ then is fixed so that the values and positions of $W_5$ and its identifier $IDFR_5$ are made permanent. The exchange resulted because: (1) the binary code words associated with indices "5" and "6" differed by only one bit; and (2) the identifiers for the words having indices "5" and "6" were equal. Thus, the word and identifier originally having index "6" were moved to a position having index "7," and the word and identifier originally having index "7" were moved to the position in the dictionary having index "6." It is to be noted that the code words for indices (as opposed to words) "6" and "7" did not change. Continuing with program 48 results in dictionary 20 having the structure shown in TABLE 3.

TABLE 2

| Word Index (i) | Word ($W_{(i)}$) | Identifier ($IDF_i$) | Code word | Nearest code words | Boolean Flag ($BF_i$) |
|---|---|---|---|---|---|
| 1 | The | Definite article | 01 |  | TRUE |
| 2 | Move | Verb | 001 | Orange | TRUE |
| 3 | Orange | Adjective | 011 | Move | TRUE |
| 4 | Cruise | Verb | 0001 | USS | TRUE |
| 5 | USS | Adjective | 0011 | Cruise, Norfolk | TRUE |
| 6 | Norfolk | Noun | 0111 | USS | FALSE |
| 7 | Red | Adjective | 00001 | Sailor | FALSE |
| 8 | Sailor | Noun | 00011 | Red, To | FALSE |
| 9 | To | Preposition | 00111 | Sailor, Is | FALSE |
| 10 | Is | Verb | 01111 | To | FALSE |
| 11 | Chicago | Noun | 000001 | For | FALSE |
| 12 | For | Preposition | 000011 | Chicago, Night | FALSE |
| 13 | Night | Noun | 000111 | For, Bluefin | FALSE |
| 14 | Bluefin | Noun | 001111 | For, And | FALSE |
| 15 | And | Conjunction | 011111 | Bluefin | FALSE |
| 16 | Quickiy | Adverb | 0000001 | Bahrain | FALSE |
| 17 | Bahrain | Noun | 0000011 | Quietly, Quickly | FALSE |
| 18 | Quietly | Adverb | 0000111 | Bahrain, Opera- | FALSE |
| 19 | Operations | Noun | 0001111 | Bahrain, Torpedo | FALSE |

TABLE 3

| Word Index (i) | Word ($W_{(i)}$) | Identifier ($IDFR_i$) | Code word | Nearest code words | Boolean Flag ($BF_i$) |
|---|---|---|---|---|---|
| 1 | The | Definite article | 01 |  | TRUE |
| 2 | Move | Verb | 001 | Orange | TRUE |
| 3 | Orange | Adjective | 011 | Move | TRUE |
| 4 | Cruise | Verb | 0001 | USS | TRUE |
| 5 | USS | Adjective | 0011 | Cruise, Norfolk | TRUE |
| 6 | Norfolk | Noun | 0111 | USS | TRUE |
| 7 | Red | Adjective | 00001 | Sailor | TRUE |
| 8 | Sailor | Noun | 00011 | Red, To | TRUE |
| 9 | Preposition |  | 00111 | Sailor, Is | TRUE |
| 10 | Is | Verb | 01111 | To | TRUE |
| 11 | Chicago | Noun | 000001 | For | TRUE |
| 12 | For | Preposition | 000011 | Chicago, Night | TRUE |
| 13 | Night | Noun | 000111 | For,And | TRUE |
| 14 | And | Conjunction | 001111 | Night, Bluefin | TRUE |
| 15 | Bluefin | Noun | 011111 | And | TRUE |
| 16 | Quickly | Adverb | 0000001 | Bahrain | TRUE |
| 17 | Bahrain | Noun | 0000011 | Quietly, Quickly | TRUE |
| 18 | Quietly | Adverb | 0000111 | Bahrain, Opera- | TRUE |
| 19 | Operations | Noun | 0001111 | Bahrain, Torpedo | TRUE |

An example of an application of the invention is described below. Assume a message to be sent reads as follows:

"USS Bluefin to cruise to Bahrain for night operations." The code words of the words from TABLE 3 that are identical to the words in the message are used to construct an encoded message whereby code words substitute for message words. In this example, the encoded message correctly reads:

"0011 011111 00111 0001 00111 0000011 000011 000111 0001111."

By way of example, new words are preceded by a "0," although other prefixes may also be used. If the coded message is received with some errors, indicated for example, by italicized words having underscored bit values, the erroneous message may look as follows:

"0011 011111 0_1_111 0001 00111 0000011 000011 0000_1_1 0001111"

In this example, the third code word for the word to is 00111, however, the received code word is 01111. Thus, the value of the second bit of the third code word is in error. Also, the eighth code word is 000111, but the received code word for the eighth word is 000011. Thus, the value of the fourth bit in the eighth code word is in error. The erroneous translation reads:

"USS Bluefin Is Cruise To Bahrain For For Operations," where the erroneous words are italicized. Obviously, the translated message has syntax errors. For clarity, the coding and decoding of the message may be more readily compared by review of TABLE 4.

TABLE 4

| Message | USS | Bluefin | to | cruise | to | Bahrain | for | night | operations |
|---|---|---|---|---|---|---|---|---|---|
| Dictionary Word | USS | Bluefin | to | cruise | to | Bahrain | for | night | operations |
| Code Word | 0011 | 011111 | 00111 | 0001 | 00111 | 0000011 | 000011 | 000111 | 0001111 |
| Rcvd Code Word | 0011 | 011111 | 01111 | 0001 | 00111 | 0000011 | 000011 | 000011 | 0001111 |
| Translation | USS | Bluefin | is | cruise | to | Bahrain | for | for | operations |
| Candidate Corrections | USS | Bluefin | {is,to} | cruise | to | Bahrain | for | {for, Chicago, night} | operations tions |

A human reader would notice that the third and eighth words of the translated message do not comply with standard English syntax. The human operator may then enter the translated words suspected of being in error as message 42 into input device 40. By way of example, input device 40 may be a keyboard, or a microphone used in conjunction with speech synthesis software. Computer 32 will then employ dictionary 34 to find the words {is, to} and {Chicago, For, Night} and present them as possible correction word candidates for the third and eight words, respectively, suspected as being erroneous because in dictionary 34, the code words for {is, to} and {Chicago, For, Night} are all only one bit different from the code words for dictionary words TO and NIGHT, as summarized in TABLE 5, below.

TABLE 5

| Word | Code word |
|---|---|
| is | 01111 |
| to | 00111 |
| Chicago | 000001 |
| for | 000011 |
| night | 000111 |

Thus, the presence of the error(s) may be readily determined from the context to the translated message and possible corrections for the errors are presented on display 38.

Obviously, many modifications and variations of the present invention are possible in light of the above teachings. For example, the use of standard language syntax to reveal binary encoded transmission errors may be applied not only to English language messages, but also to other languages as well. It is therefore to be understood that within the scope of the appended claims, the invention may be practiced otherwise than as specifically described.

I claim:

1. A method for encoding and decoding a binary encoded text message using context-based error detection and correction, comprising the steps of:

defining a dictionary of m dictionary words, $W_i$, where each dictionary word is assigned a unique binary code word, represented by a series of bits, and an identifier, $IDFR_i$ such that for any two words $W_p$ and $W_q$ from said dictionary, if $IDFR_p = IDFR_q$, then said binary code word for said word $W_p$ differs from said binary code word for said word $W_q$ by more than one bit, and where i, p, and q are each an index from 1 to (m−1), and m is a positive integer;

receiving a message comprised of words selected from said dictionary;

encoding said message to form an encoded message comprised of selected ones of said dictionary words;

transmitting said encoded message;

receiving said encoded message;

decoding said encoded message to form a decoded message comprised of decoded message words;

displaying said decoded message words; and displaying candidate words from said dictionary having code words one bit different from said code words associated with suspected erroneous words selected from said decoded message words if said decoded message includes any suspected erroneous words.

2. A method for encoding a binary encoded text message, comprising the steps of:

defining a dictionary of m dictionary words, $W_i$, where each dictionary word is assigned a unique binary code word, represented by a series of bits, and an identifier, $IDFR_i$ such that for any two words $W_p$ and $W_q$ from said dictionary, if $IDFR_p = IDFR_q$, then said binary code word for said word $W_p$ differs from said binary code word for said word $W_q$ by more than one bit, and where i, p, and q are each an index from 1 to (m−1), and m is a positive integer;

receiving a message comprised of words selected from said dictionary; and encoding said message to form an encoded message comprised of any of said dictionary words.

3. The method of claim 2 further including the step of transmitting said encoded message.

4. A method for decoding a binary encoded text message using context-based error detection and correction, comprising the steps of:

defining a dictionary of m dictionary words, $W_i$, where each dictionary word is assigned a unique binary code word, represented by a series of bits, and an identifier, $IDFR_i$ such that for any two words $W_p$ and $W_q$ from said dictionary, if $IDFR_p = IDFR_q$, then said binary code word for said word $W_p$ differs from said binary code word for said word $W_q$ by more than one bit, and where i, p, and q are each an index from 1 to (m−1), and m is a positive integer;

receiving an encoded message comprised of words selected from said dictionary;

decoding said encoded message to form a decoded message comprised of decoded message words;

displaying said decoded message words; and displaying candidate words from said dictionary having code words one bit different from said code words associated with suspected erroneous words selected from said decoded message words if said decoded message includes any suspected erroneous words.

5. A system for encoding and decoding a binary encoded text message using context-based error detection and correction, comprising:

a first input device for transforming a first input message into a message output signal;

a first computer for transforming said message output signal into a binary encoded message comprised of binary code words selected from a first dictionary, where said first dictionary is stored in a first memory structure functionally integrated with said first computer and includes m dictionary words, $W_i$, where each dictionary word is assigned a unique binary code word, represented by a series of bits, and an identifier, $IDFR_i$ such that for any two words $W_p$ and $W_q$ from said dictionary, if $IDFR_p=IDFR_q$, then said binary code word for said word $W_p$ differs from said binary code word for said word $W_q$ by more than one bit, where i, p, and q are each an index from 1 to (m−1), and m is a positive integer;

a transmitter for transmitting said binary encoded message;

a receiver for receiving said binary encoded message;

a second computer for decoding said binary encoded message to form a decoded message comprised of decoded message words selected from a second dictionary stored in a second memory structure functionally integrated with said second computer, where said second dictionary is substantially identical to said first dictionary;

a display device for displaying said decoded message and said second dictionary words having code words one bit different from said code words associated with suspected erroneous words selected from said decoded message words if said decoded message includes any suspected erroneous words; and a second input device for providing a second input message representing said suspected erroneous words to said second computer.

6. A system for encoding binary encoded text message using context-based error detection and correction, comprising:

a first input device for transforming a first input message into a message output signal;

a first computer for transforming said message output signal into a binary encoded message comprised of binary code words selected from said first dictionary, where said first dictionary is stored in a first memory structure of said first computer and includes m dictionary words, $W_i$, where each dictionary word is assigned a unique binary code word, represented by a series of bits, and an identifier $IDFR_i$ such that for any two words $W_p$ and $W_q$ from said dictionary, if $IDFR_p=IDFR_q$, then said binary code word for said word $W_p$ differs from said binary code word for said word $W_q$ by more than one bit, and where i, p, and q are each an index from 1 to (m−1), and m is a positive integer; and a transmitter for transmitting said binary encoded message.

7. A system for decoding binary encoded text message using context-based error detection and correction, comprising:

a receiver for receiving a binary encoded message;

a computer for decoding said binary encoded message to form a decoded message comprised of decoded message words selected from a dictionary stored in a memory structure in said computer, where said dictionary includes m dictionary words, $W_i$, where each dictionary word is assigned a unique binary code word, represented by a series of bits, and an identifier $IDFR_i$ such that for any two words $W_p$ and $W_q$ from said dictionary, if $IDFR_p=IDFR_q$, then said binary code word for said word $W_p$ differs from said binary code word for said word $W_q$ by more than one bit, and where i, p, and q are each an index from 1 to (m−1), and m is a positive integer;

a display device for displaying said decoded message and said dictionary words having code words one bit different from code words associated with suspected erroneous words selected from said decoded message words if said decoded message includes any suspected erroneous words; and an input device for providing an input message representing said suspected erroneous words to said second computer.

* * * * *